United States Patent
Do Valle et al.

(10) Patent No.: US 12,054,592 B2
(45) Date of Patent: Aug. 6, 2024

(54) POLYURETHANE COATED HEAT-SHRINKABLE FILM

(71) Applicants: Dow Global Technologies LLC, Midland, MI (US); PBBPolisur S.R.L., Buenos Aires (AR); Rohm and Haas Company, Collegeville, PA (US)

(72) Inventors: Camila Do Valle, Sao Paulo (BR); Juan Carlos Casarubias, Toluca (MX); Maximiliano Zanetti, Buenos Aires (AR); Marlos Giuntini de Oliveira, Sao Paulo (BR); Jorge Caminero Gomes, Jundiai (BR)

(73) Assignees: Dow Global Technologies LLC, Midland, MI (US); PBBPolisur S.R.L., Buenos Aires (AR); Rohm and Haas Company, Collegeville, PA (US)

( * ) Notice: Subject to any disclaimer, the term of this patent is extended or adjusted under 35 U.S.C. 154(b) by 939 days.

(21) Appl. No.: 16/971,117

(22) PCT Filed: Feb. 27, 2019

(86) PCT No.: PCT/US2019/019725
§ 371 (c)(1),
(2) Date: Aug. 19, 2020

(87) PCT Pub. No.: WO2019/168898
PCT Pub. Date: Sep. 6, 2019

(65) Prior Publication Data
US 2021/0086490 A1  Mar. 25, 2021

Related U.S. Application Data

(60) Provisional application No. 62/636,471, filed on Feb. 28, 2018.

(51) Int. Cl.
*B32B 27/32* (2006.01)
*B32B 27/08* (2006.01)
(Continued)

(52) U.S. Cl.
CPC ............. *C08J 5/18* (2013.01); *B32B 27/08* (2013.01); *B32B 27/32* (2013.01); *C08G 18/10* (2013.01);
(Continued)

(58) Field of Classification Search
CPC ......... B32B 27/32; B32B 2255/26; C08J 5/18
See application file for complete search history.

(56) References Cited

U.S. PATENT DOCUMENTS 3,645,992 A   2/1972   Elston
3,914,342 A  10/1975   Mitchell
(Continued)

FOREIGN PATENT DOCUMENTS

CN   201510854974 A   3/2016
CN      107636050 A   1/2018
(Continued)

OTHER PUBLICATIONS

Data Sheet Agility 2001 (Year: 2023).*
(Continued)

*Primary Examiner* — Michael M Dollinger
(74) *Attorney, Agent, or Firm* — Dinsmore & Shohl LLP

(57) ABSTRACT

A heat-shrinkable film which includes an ethylene-based polymer multilayer or monolayer film and a coating on an outer surface of the ethylene-based polymer film. The ethylene-based polymer film having a single layer or a multilayer structure formed from a first layer, a second layer, and at least one inner layer between the first and second layers. The coating including polyurethane which is the polymerized reaction product of: a polyol; and an aromatic isocya-
(Continued)

nate functional prepolymer. Further, a method of unitizing polymer wrapped primary packages is provided. The method includes wrapping one or more of the primary packages with the heat-shrinkable film with the coating disposed proximal the one or more primary packages and applying thermal energy to reduce the dimensions of the heat-shrinkable film to constrain the primary package within the heat-shrinkable film. The coating serving to alleviate sticking between the heat-shrinkable film and the polymer wrapped primary package.

8 Claims, 3 Drawing Sheets

(51) Int. Cl.
    *C08G 18/10* (2006.01)
    *C08G 18/48* (2006.01)
    *C08G 18/76* (2006.01)
    *C08J 5/18* (2006.01)
    *C08J 7/04* (2020.01)

(52) U.S. Cl.
    CPC ......... *C08G 18/48* (2013.01); *C08G 18/7621* (2013.01); *C08G 18/7657* (2013.01); *C08J 7/0427* (2020.01); *B32B 2250/03* (2013.01); *B32B 2250/242* (2013.01); *B32B 2250/40* (2013.01); *B32B 2255/10* (2013.01); *B32B 2255/26* (2013.01); *B32B 2307/31* (2013.01); *B32B 2323/046* (2013.01); *B32B 2553/00* (2013.01); *C08G 2150/00* (2013.01); *C08J 2375/06* (2013.01); *C08J 2375/08* (2013.01)

(56) References Cited

U.S. PATENT DOCUMENTS

| | | | |
|---|---|---|---|
| 4,015,051 | A | 3/1977 | Offermann et al. |
| 4,076,698 | A | 2/1978 | Anderson et al. |
| 5,272,236 | A | 12/1993 | Lai et al. |
| 5,278,272 | A | 1/1994 | Shih-Yaw et al. |
| 5,582,923 | A | 12/1996 | Kale et al. |
| 5,614,297 | A | 3/1997 | Velazquez |
| 5,733,155 | A | 3/1998 | Sagawa |
| 5,854,045 | A | 12/1998 | Fang et al. |
| 7,018,689 | B2 | 3/2006 | Lee et al. |
| 2010/0215933 | A1* | 8/2010 | Fiscus .................. B32B 27/306 525/240 |
| 2016/0240830 | A1* | 8/2016 | Mizuno .................. C08J 7/0427 |
| 2017/0259541 | A1 | 9/2017 | Leano et al. |
| 2018/0079880 | A1 | 3/2018 | Miyake et al. |

FOREIGN PATENT DOCUMENTS

| | | | |
|---|---|---|---|
| KR | 20160016995 A | 2/2016 | |
| WO | WO-2016044938 A1 * | 3/2016 | ............ B32B 27/08 |
| WO | 2016089494 A1 | 6/2016 | |
| WO | 2016196168 A1 | 12/2016 | |
| WO | 2017210087 A1 | 12/2017 | |

OTHER PUBLICATIONS

Data Sheet DOW LDPE 132i (Year: 2023).*
Poliol from Sigma Aldrich. Evidentiary Reference. (Year: 2024).*
JP Office Action, dated Jul. 25, 2023, pertaining to Japanese Patent Application No. 2020-542313, 8 pgs.
Communication pursuant to Article 94(3) EPC dated Mar. 23, 2022 pertaining to European Patent Application 19713903.3.
Japanese Office Action dated Jan. 10, 2023 pertaining to Japanese patent application No. 2020-542313, 16 pages.
Examination Report dated Aug. 22, 2022, pertaining to Argentine Patent Application No. 20190100497 2 pages.
Communication pursuant to Article 94(3) EPC dated Aug. 17, 2022, pertaining to European Patent Application No. 19713903.3 3 pages.
Technical Report dated Sep. 13, 2022, pertaining to Brazilian Patent Application No. 112020016053.9 9 7 pages.
Chinese Office Action dated Sep. 30, 2022 pertaining to Chinese Patent Application No. 201980011122.1 8 pages.
Chinese Search Report dated Sep. 30, 2022 pertaining to Chinese Patent Application No. 201980011122.1 8 pages.
Communication pursuant to Rules 161(1) and 162 EPC dated Oct. 9, 2020, pertaining to European Patent Application 19713903.3.
International Search Report and Written Opinion pertaining to PCT/US2019/019725, dated Jun. 18, 2019.
Malaysia Substantive Examination Report dated May 15, 2024, pertaining to MY Patent Application No. PI2020003967, 2 pgs.

* cited by examiner

POLYURETHANE COATED HEAT-SHRINKABLE FILM

CROSS REFERENCE TO RELATED APPLICATION

This application is a National Stage Entry under 35 U.S.C. § 371 of International Patent Application No. PCT/US2019/019725, filed Feb. 27, 2019, which claims the benefit of U.S. Provisional Patent Application Serial No. 62/636,471 filed Feb. 28, 2018, both of which are hereby incorporated by reference in their entireties.

TECHNICAL FIELD

Embodiments described herein relate generally to heat-shrinkable films, and more particularly to heat-shrinkable films having a polyurethane coating layer. Such heat-shrinkable film can be used as secondary packaging for grouping multiple products together in the process of unitization.

BACKGROUND

Shrink films are commonly used for packaging of products, such as consumer goods products. For example, bundles of plastic bottles can be secured by a shrink film package that secures the plastic bottles together. Shrink films may include polymer films that are placed around an object and are shrunken relative to their original dimensions to at least partially surround the object and secure the item or items held within and produce a primary package. For example, plastic beverage containers can be bundled and secured in shrink film. Advantages of shrink film over other traditional packaging, such as cardboard packaging, may include reduced environmental impact, cost savings, its ability to be see-through, and its ability to serve as both a packaging for shipping as well as for consumer display.

The logistics and supply chain of bringing individually packaged products to market frequently necessitates unitization of the individually packaged products. Unitization is the grouping of several individually packaged products together in order to ease handling, transport, and storage as well as offer protection of the individually packaged products during handling, transport, and storage. Unitization is commonly achieved by applying a secondary shrink film or secondary packaging over the primary package. However, when currently available shrink films are used as over shrink films to provide the secondary packaging and bundle the individual primary packages, it commonly results in adhesion of the secondary packaging to the primary packages after shrinkage of the secondary packaging. This adhesion is undesirable and results in both structural and visual damage to the primary packages resulting in unsaleable or flawed products.

Accordingly, there is a need for coated films for use in secondary packaging, which unitizes primary packages and eases removal of the underlying primary package without damage.

SUMMARY

Embodiments of the present disclosure meet those needs by providing heat-shrinkable film comprising a coating on an outer surface of the heat-shrinkable film. The coating alleviates adhesion of the heat-shrinkable film to the underlying shrink film used for packaging individual products when the heat-shrinkable film is used to unitize the individual saleable products into a larger parcel for ease of handling and protection during the logistics and supply chain to store shelves.

According to at least one embodiment of the present disclosure, a heat-shrinkable film is provided. The heat-shrinkable film includes (a) a multilayer film and (b) a coating on an outer surface of the first layer or second layer of the film. The multilayer film includes (i) a first layer formed from 30 to 100 percent by weight of a first ethylene-based polymer, the first ethylene-based polymer having a density from 0.905 to 0.930 g/cm$^3$, a melt index ($I_2$) of 0.1 to 2.0 g/10 min when measured according to ASTM D 1238 at 190° C. and 2.16 kg load, and a peak melting point of less than 126° C. as measured using Differential Scanning calorimetry (DSC); (ii) a second layer formed from 50 to 100 percent by weight of a second ethylene-based polymer, the second ethylene-based polymer having a density from 0.905 to 0.970 g/cm$^3$ and a peak melting point in the range of 100° C. to 135° C. as measured using DSC; and (iii) at least one inner layer between the first layer and the second layer comprising 10 to 50 percent by weight of a third ethylene-based polymer having a density from 0.930 to 0.970 g/cm$^3$ and a peak melting point in the range of 120° C. to 135° C. as measured using DSC. The coating includes polyurethane formed from: (a) a polyol; and (b) an aromatic isocyanate functional prepolymer.

According to additional embodiments of the present disclosure, a heat-shrinkable film is provided. The heat-shrinkable film includes (a) a monolayer film and (b) a coating on an outer surface of the monolayer film. The monolayer film includes 30 to 60 percent by weight of a fourth ethylene-based polymer, where the fourth ethylene-based polymer has a density of 0.905 to 0.930 g/cm$^3$, a melt index ($I_2$) of 0.1 to 0.9 g/10 min when measured according to ASTM D 1238 at 190° C. and 2.16 kg load, and a peak melting point of less than 126° C. as measured using DSC. The coating includes polyurethane formed from: (a) a polyol; and (b) an aromatic isocyanate functional prepolymer.

According to another embodiment, a packaging assembly is provided. The packaging assembly includes a plurality of packages, wherein each package comprises a plurality of items bundled together by a primary packaging film comprised of polymeric material, where the primary packaging film is wrapped around the plurality of items to form a primary package. The packaging assembly further includes a secondary packaging film used to bundle the plurality of packages, wherein the secondary packaging film comprises the heat-shrinkable film in accordance with embodiments of the present disclosure.

According to yet additional embodiments of the present disclosure, a method of unitizing polymer wrapped primary packages is provided. The method includes wrapping one or more of the primary packages with a polyurethane coated heat-shrinkable film according to embodiments of the present disclosure and applying thermal energy to reduce the dimensions of the polyurethane coated heat-shrinkable film to constrain the primary package within the polyurethane coated heat-shrinkable film. During wrapping, the polyurethane coating is disposed proximal the one or more primary packages.

These and other embodiments are described in more detail in the Detailed Description. It is to be understood that both the foregoing general description and the following detailed description present embodiments of the technology, and are intended to provide an overview or framework for understanding the nature and character of the technology as it is claimed. The accompanying drawings are included to provide a further understanding of the technology, and are incorporated into and constitute a part of this specification. The drawings illustrate various embodiments and together with the description serve to explain the principles and operations of the technology. Additionally, the drawings and descriptions are meant to be merely illustrative, and are not intended to limit the scope of the claims in any manner.

BRIEF DESCRIPTION OF THE DRAWINGS

The following detailed description of specific embodiments of the present disclosure can be best understood when read in conjunction with the following drawings, where like structure is indicated with like reference numerals

DETAILED DESCRIPTION

Definitions

Figure 1A:
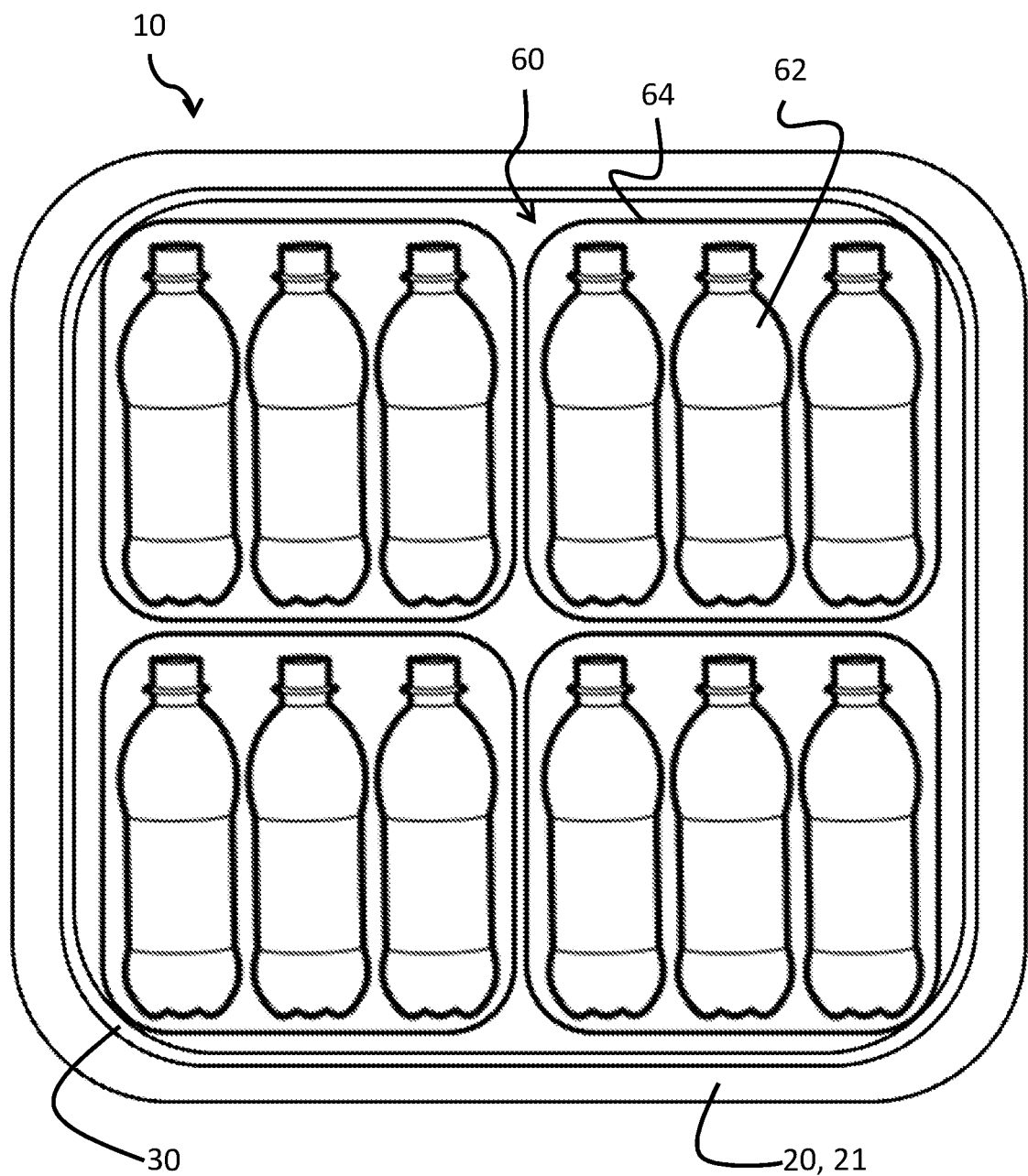
FIG. 1A is a schematic depicting polyurethane coated monolayer heat-shrinkable film unitizing multiple primary packages in accordance with one or more embodiments of this disclosure.

The term "polymer" refers to a polymeric compound prepared by polymerizing monomers, whether of the same or a different type. The generic term polymer thus embraces the term "homopolymer," usually employed to refer to polymers prepared from only one type of monomer as well as "copolymer" which refers to polymers prepared from two or more different monomers.

"Polyethylene" or "ethylene-based polymer" shall mean polymers comprising greater than 50% by mole of units derived from ethylene monomer. This includes ethylene-based homopolymers or copolymers (meaning units derived from two or more comonomers). Common forms of polyethylene known in the art include, but are not limited to, Low Density Polyethylene (LDPE); Linear Low Density Polyethylene (LLDPE); Ultra Low Density Polyethylene (ULDPE); Very Low Density Polyethylene (VLDPE); single-site catalyzed Linear Low Density Polyethylene, including both linear and substantially linear low density resins (m-LLDPE); Medium Density Polyethylene (MDPE); and High Density Polyethylene (HDPE).

The term "LDPE" may also be referred to as "high pressure ethylene polymer" or "highly branched polyethylene" and is defined to mean that the polymer is partly or entirely homopolymerized or copolymerized in autoclave or tubular reactors at pressures above 14,500 psi (100 MPa) with the use of free-radical initiators, such as peroxides (see, for example, U.S. Pat. No. 4,599,392, which is hereby incorporated by reference). LDPE resins typically have a density in the range of 0.916 to 0.940 g/cm.

The term "LLDPE", includes resin made using Ziegler-Natta catalyst systems as well as resin made using single-site catalysts, including, but not limited to, bis-metallocene catalysts (sometimes referred to as "m-LLDPE"), phosphinimine, and constrained geometry catalysts; and resin made using post-metallocene, molecular catalysts, including, but not limited to, bis(biphenylphenoxy) catalysts (also referred to as polyvalent aryloxyether catalysts). LLDPE includes linear, substantially linear, or heterogeneous ethylene-based copolymers or homopolymers. LLDPEs contain less long chain branching than LDPEs and include the substantially linear ethylene polymers, which are further defined in U.S. Pat. Nos. 5,272,236; 5,278,272; 5,582,923; and 5,733,155; the homogeneously branched ethylene polymers such as those in U.S. Pat. No. 3,645,992; the heterogeneously branched ethylene polymers such as those prepared according to the process disclosed in U.S. Pat. No. 4,076,698; and blends thereof (such as those disclosed in U.S. Pat. No. 3,914,342 or 5,854,045). The LLDPE resins can be made via gas-phase, solution-phase or slurry polymerization or any combination thereof, using any type of reactor or reactor configuration known in the art. The LLDPE resins can be made via gas-phase, solution-phase, or slurry polymerization or any combination thereof, using any type of reactor or reactor configuration known in the art.

The term "HDPE" refers to polyethylenes having densities of about 0.940 g/cm or greater, which are generally prepared with Ziegler-Natta catalysts, chrome catalysts or even metallocene catalysts.

"Polypropylene" or "propylene-based polymers" shall mean polymers comprising greater than 50% by weight of units which have been derived from propylene monomer. This includes polypropylene homopolymers or copolymers (meaning units derived from two or more comonomers). Common forms of polypropylene known in the art include homopolymer polypropylene (hPP), random copolymer polypropylene (rcPP), impact copolymer polypropylene (hPP+at least one elastomeric impact modifier) (ICPP) or high impact polypropylene (HIPP), high melt strength polypropylene (HMS-PP), isotactic polypropylene (iPP), syndiotactic polypropylene (sPP), and combinations thereof.

"Multilayer structure" means any structure having more than one layer. For example, the multilayer structure (for example, a film) may have two, three, four, five or more layers. A multilayer structure may be described as having the layers designated with letters. For example, a three layer structure having a core layer B, and two external layers A and C may be designated as A/B/C. Likewise, a structure having two core layers B and C and two external layers A and D would be designated A/B/C/D.

The terms "heat-shrinkable film," "shrink film," or "collation shrink films" refers to any polymer film material that can be shrunken to fit around and secure one or more items. This may encompass "primary packaging" and "secondary packaging." Without being bound by theory, shrinkage in shrink films may occur due to relaxation of the orientation stresses of the plastics during the shrink process. Shrink films may include polymers such as, but not limited to, ethylene-based polymers or propylene-based polymers as referenced above. Shrink films may be in multi-layer structures, or in a monolayer structure.

The term "primary packaging" refers to polymer films that are placed around an object and are shrunken relative to their original dimensions to at least partially surround the object and secure the item or items held within and produce a primary package. The primary package is generally the saleable item placed on a store shelf or delivered to a consumer such as a wrapped 6 unit pack of beverage bottles.

The term "secondary packaging" refers to polymer films that are placed around a plurality of primary packages to provide a consolidated grouping of primary packages to ease handling, transport, and storage as well as offer protection of the primary packages during handling, transport, and storage.

Unless otherwise indicated, the disclosure of any ranges in the specification and claims are to be understood as including the range itself and also anything subsumed therein, as well as endpoints.

Figure 1B:
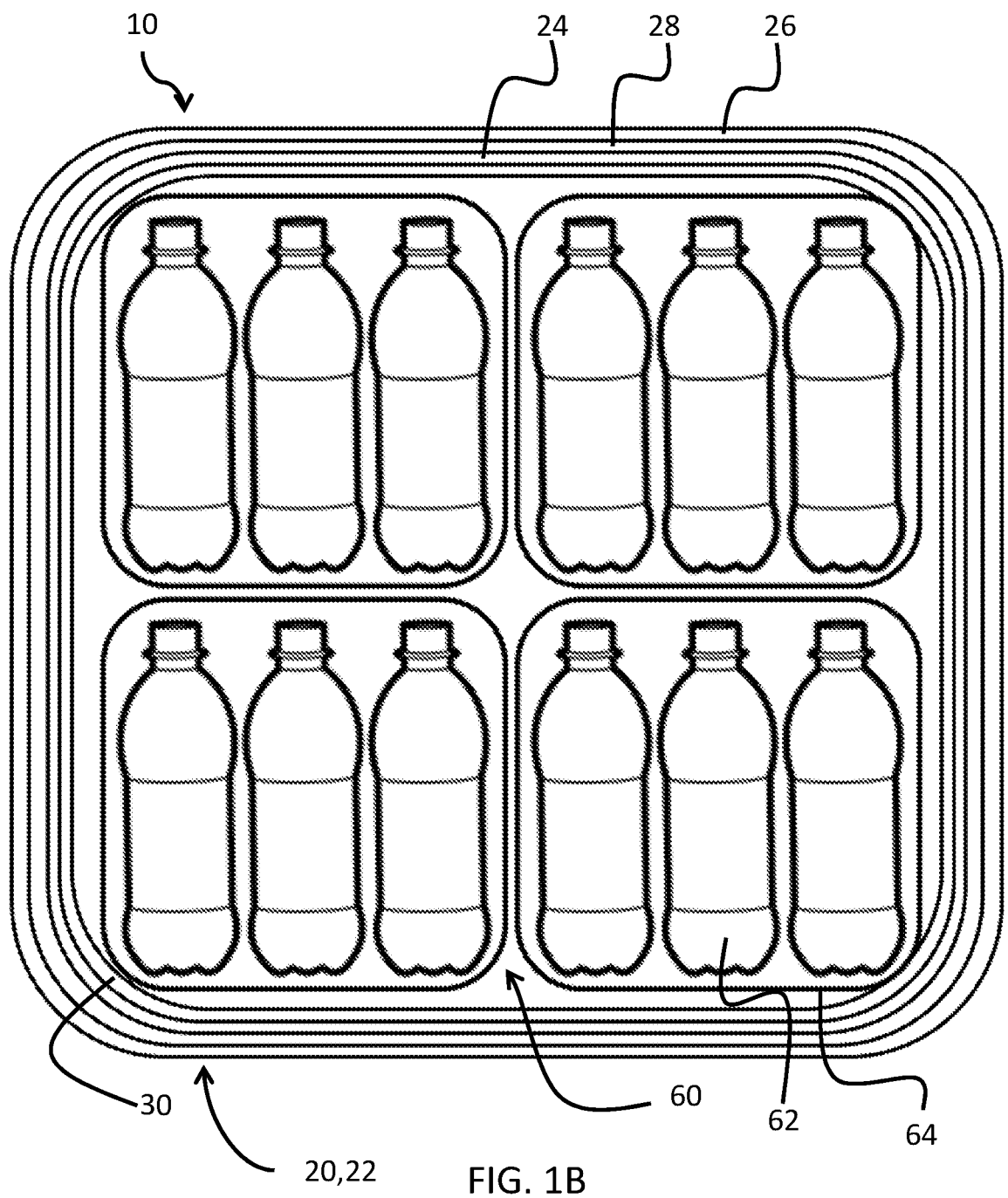
FIG. 1B is a schematic depicting polyurethane coated multilayer heat-shrinkable film unitizing multiple primary packages in accordance with one or more embodiments of this disclosure.

Referring to FIGS. 1A and 1B, embodiments of the instantly disclosed heat-shrinkable films 10 include a polymer film 20 and a coating 30 on an outer surface of the polymer film 20. Specific embodiments of the present application will now be described. The disclosure may, however, be embodied in different forms and should not be construed as limited to the embodiments set forth in this disclosure. Rather, these embodiments are provided so that this disclosure will be thorough and complete, and will fully convey the scope of the subject matter to those skilled in the art.

With reference to FIG. 1A, in one or more embodiments, the heat-shrinkable film 10 includes a monolayer polymer film 21 as its polymer layer 20. The monolayer film 21 comprises ethylene-based polymer.

With reference to FIG. 1B, in one or more embodiments, the heat-shrinkable film 10 includes a multilayer film 22 as its polymer film 20. The multilayer film 22 may comprise a first layer 24, a second layer 26, and at least one inner layer 28 between the first layer 24 and the second layer 26. As indicated for multilayer structures, the multilayer film 22 may be formed as a three layer structure having a core layer B, and two external layers A and C arranged as A/B/C. Similarly, the multilayer film 22 may be formed as a structure having two core layers B and C and two external layers A and D arranged as A/B/C/D. It will be appreciated that the multilayer structure of embodiments of the multilayer film 22 provides innumerable possibilities such as A/B/A, A/B/C/A, and A/B/C/B/D with the present disclosure contemplating each possibility.

Referring again to the embodiment of FIG. 1B, the first layer 24 of the multilayer film 22 comprises from 30 to 100 percent by weight (wt. %) of a first ethylene-based polymer having a density from 0.905 to 0.930 grams per cubic centimeter (g/cm$^3$), a melt index (I$_2$) measured according to ASTM D 1238 of 0.1 to 2.0 grams per 10 minutes (g/10 min), and a peak melting point of less than 126° C. as measured according to Differential Scanning calorimetry (DSC). An individual values and subranges from 30 to 100 wt. % are included herein and disclosed herein; for example the amount of the first ethylene-based polymer with the delineated characteristics can be from a lower limit of 30, 40, or 50 wt. % to an upper limit of 70, 80, 90, or 100 wt. %. For example, the amount of the first ethylene-based polymer can be from 30 to 80 wt. %, or in the alternative, from 40 to 90 wt %, or in the alternative, from 35 to 55 wt. %, or in the alternative from 62 to 87 wt %.

As indicated, the first ethylene-based polymer may have a density from 0.905 to 0.930 g/cm$^3$. All individual values and subranges from 0.905 to 0.930 g/cm$^3$ are included herein and disclosed herein; for example, the density of the first ethylene-based polymer can be from an upper limit of 0.928, 0.925, 0.920 or 0.915 g/cm$^3$ and a lower limit of 0.910, 0.915, 0.920, or 0.925 g/cm$^3$.

As indicated, the first ethylene-based polymer may have a melt index (I$_2$) measured according to ASTM D 1238 of 0.1 to 2.0 g/10 min. All individual values and subranges from 0.1 to 2.0 g/10 min are included herein and disclosed herein; for example, the melt index of the first ethylene-based polymer can be from an upper limit of 2.0, 1.7, 1.4, 1.1, or 0.9 g/10 minutes and a lower limit of 0.1, 0.2, 0.3, 0.4, 0.6, or 0.8 g/10 min.

The first ethylene-based polymer may have a peak melting point of 126° C. or less in some embodiments. The first ethylene-based polymer may have a peak melting point of 125° C. or less, 120° C. or less, 118° C. or less, or 115° C. or less in various further embodiments. Additionally, the first ethylene-based polymer may have a peak melting point of greater than 95° C., greater than 100° C., or greater than 105° C. in various embodiments.

Examples of the first ethylene-based polymer may include those commercially available from the Dow Chemical Company, Midland, Mich. including, for example, DOW™ LOPE 1321, DOWLEX™ NG 2045B, and ELITE™ 5111G.

Referring again to the multilayer film 22 embodiment of FIG. 1B, the second layer 26 comprises from 50 to 100 wt. % of a second ethylene-based polymer having a density from 0.905 to 0.970 g/cm$^3$ and a peak melting point in the range of 100° C. to 135° C. All individual values and subranges from 50 to 100 wt. % are included herein and disclosed herein; for example, the amount of the second ethylene-based polymer with the delineated characteristics can be from a lower limit of 50, 60, or 70 wt. % to an upper limit of 80, 90, or 100 wt. %. For example, the amount of the second ethylene-based polymer can be from 50 to 80 wt. %, or in the alternative, from 60 to 90 wt. %, or in the alternative, from 65 to 85 wt. %, or in the alternative from 62 to 87 wt. %.

As indicated, the second ethylene-based polymer may have a density from 0.905 to 0.970 g/cm$^3$. All individual values and subranges from 0.905 to 0.970 g/cm$^3$ are included herein and disclosed herein; for example, the density of the first ethylene-based polymer can be from an upper limit of 0.968, 0.960, 0.955 or 0.950 g/cm$^3$ and a lower limit of 0.910, 0.915, 0.920, or 0.925 g/cm$^3$.

The second ethylene-based polymer may have a peak melting point in the range of 100° C. to 135° C. In some embodiments, the second ethylene-based polymer may have a different peak melting point than the first ethylene-based polymer. The second ethylene-based polymer may have a peak melting point upper limit of 135° C., 130° C., 125° C., or 120° C. and a peak melting point lower limit of 100° C., 105° C., 110° C., or 115° C. in various further embodiments.

Examples of the second ethylene-based polymer may include those commercially available from the Dow Chemical Company, Midland, Mich., including, for example, DOW™ LDPE 1321, DOWLEX™ NG 2045B, UNIVAL™ DMDA 6200 NT7, and ELITE™ 5111G.

In one or more embodiments where the film is a multilayer film, the at least one inner layer 28 comprises from 10 to 50 wt. % of a third ethylene-based polymer having a density from 0.930 to 0.970 g/cm$^3$ and a peak melting point in the range of 120° C. to 135° C. All individual values and subranges from 10 to 50 wt. % are included herein and disclosed herein; for example the amount of the third ethylene-based polymer with the delineated characteristics can be from a lower limit of 10, 20, or 30 wt. % to an upper limit of 30, 40, or 50 wt. %. For example, the amount of the third ethylene-based polymer can be from 10 to 40 wt. %, or in the alternative, from 20 to 50 wt. %, or in the alternative, from 15 to 45 wt,%, or in the alternative from 22 to 47 wt. %.

The third ethylene-based polymer may have a density from 0.930 to 0.970 g/cm$^3$. All individual values and subranges from 0.905 to 0.930 g/cm$^3$ are included herein and disclosed herein; for example, the density of the third ethylene-based polymer can be from an upper limit of 0.968, 0.960, 0.955 or 0.950 g/cm$^3$ and a lower limit of 0.930, 0.935, 0.940, or 0.950 g/cm$^3$.

The third ethylene-based polymer may have a peak melting point in the range of 120° C. to 135° C. in some embodiments. The second ethylene-based polymer may have a peak melting point upper limit of 135° C., 132° C., 130° C., or 128° C. and a peak melting point lower limit of 120° C., 122° C., 125° C., or 128° C. in various further embodiments.

Examples of the third ethylene-based polymer may include those commercially available from the Dow Chemical Company, Midland, Mich., including, for example, DOWLEX™ NG 2038B and UNIVAL™ DMDA 6200 NT7.

Having briefly described the scope and breadth of the multilayer film of the heat-shrinkable film, specific examples of multilayer film components and construction are provided. In one or more embodiments, the multilayer film comprises the first layer 24 comprising from 30 to 100 wt. % of the first ethylene-based polymer, the second layer 26 comprising from 50 to 100 wt. % of the second ethylene-based polymer, and the least one inner layer 28 between the first layer 24 and the second layer 26 comprising from 10 to 50 wt. % of the third ethylene-based polymer. The first ethylene-based polymer may have a density from 0.905 to 0.930 g/cm$^3$, a melt index (I$_2$) of 0.1 to 2.0 g/10 min, and a peak melting point of less than 126° C. The second ethylene-based polymer may have a density from 0.905 to 0.970 g/cm$^3$ and a peak melting point in the range of 100° C. to 135° C. Finally, the third ethylene-based polymer may have a density from 0.930 to 0.970 g/cm$^3$ and a peak melting point in the range of 120° C. to 135° C.

In some embodiments, the multilayer film comprises the first layer 24 comprising from 50 to 70 wt. % of the first ethylene-based polymer, the second layer 26 comprising from 50 to 70 wt. % of the second ethylene-based polymer, and the least one inner layer 28 between the first layer 24 and the second layer 26 comprising from 20 to 40 wt. % of the third ethylene-based polymer. The first ethylene-based polymer and the second ethylene-based polymer may each have a melt index (I$_2$) of 0.1 to 0.4 g/10 min, and a peak melting point of less than 120° C. The third ethylene-based polymer may have a density from 0.930 to 0.970 g/cm$^3$ and a peak melting point in the range of 120° C. to 135° C.

In some embodiments, the multilayer film 22 comprises the first layer 24 comprising from 30 to 50 wt. % of the first ethylene-based polymer, the second layer 26 comprising from 30 to 50 wt. % of the second ethylene-based polymer, and the least one inner layer 28 between the first layer 24 and the second layer 26 comprising from 60 to 80 wt. % of the third ethylene-based polymer. The first ethylene-based polymer and the second ethylene-based polymer may each have a melt index (I$_2$) of 0.4 to 1.0 g/10 min, and a peak melting point of less than 125° C. The third ethylene-based polymer may have a density from 0.910 to 0.930 g/cm$^3$ and a peak melting point in the range of 120° C. to 135° C.

In some embodiments, the multilayer film comprises the first layer 24 comprising from 60 to 80 wt. % of the first ethylene-based polymer, the second layer 26 comprising from 60 to 80 wt. % of the second ethylene-based polymer, and the least one inner layer 28 between the first layer 24 and the second layer 26 comprising from 60 to 85 wt. % of the third ethylene-based polymer. The first ethylene-based polymer and the second ethylene-based polymer may each have a melt index (I$_2$) of 0.3 to 1.2 g/10 min, and a peak melting point in the range of 115° C. to 135° C. The third ethylene-based polymer may have a density from 0.910 to 0.930 g/cm$^3$ and a peak melting point in the range of 120° C. to 135° C.

It will be appreciated that one or more of the first ethylene-based polymer, the second ethylene-based polymer, and the third ethylene-based polymer disposed in the first layer 24, the second layer 26, and the inner layer 28 respectively may comprise the same underlying ethylene-based polymer. For example, the first layer 24 and the second layer 26 may each comprise one or more of the same polymers.

As noted above, in some embodiments, the ethylene-based polymer layer 20 is a monolayer film 21 as shown in FIG. 1B. In such embodiments, monolayer film 21 comprises from 30 to 60 wt. % of a fourth ethylene-based polymer having a density from 0.905 to 0.930 g/cm$^3$, a melt index (I$_2$) measured according to ASTM D 1238 of 0.1 to 0.9 g/10 min, and a peak melting point of less than 126° C. All individual values and subranges from 30 to 60 wt. % are included herein and disclosed herein; for example the amount of the fourth ethylene-based polymer with the delineated characteristics can be from a lower limit of 30, 40, or 50 wt. % to an upper limit of 40, 50, or 60 wt. %. For example, the amount of the first ethylene-based polymer can be from 30 to 50 wt. %, or in the alternative, from 40 to 60 wt. %, or in the alternative, from 35 to 55 wt. %, or in the alternative from 42 to 57 wt. %.

As indicated, the fourth ethylene-based polymer may have a density from 0.905 to 0.930 g/cm$^3$. All individual values and subranges from 0.905 to 0.930 g/cm$^3$ are included herein and disclosed herein; for example, the density of the fourth ethylene-based polymer can be from an upper limit of 0.928, 0.925, 0.920 or 0.915 g/cm$^3$ and a lower limit of 0.910, 0.915, 0.920, or 0.925 g/cm$^3$.

As indicated, the fourth ethylene-based polymer may have a density a melt index (I$_2$) measured according to ASTM D 1238 of 0.1 to 0.9 g/10 min. All individual values and subranges from 0.1 to 2.0 g/10 min are included herein and disclosed herein; for example, the melt index of the fourth ethylene-based polymer can be from an upper limit of 0.9, 0.8, 0.7, or 0.6 g/10 minutes and a lower limit of 0.1, 0.2, 0.3, 0.4, 0.5, or 0.6 g/10 min.

The fourth ethylene-based polymer may have a peak melting point of 126° C. or less in some embodiments. The first ethylene-based polymer may have a peak melting point of 125° C. or less, 120° C. or less, 115° C. or less, or 110° C. or less in various further embodiments. Additionally, the fourth ethylene-based polymer may have a peak melting point of greater than 95° C., greater than 100° C., or greater than 105° C. in various embodiments.

It will be appreciated that one or more of the fourth ethylene-based polymer may be the same as one or more of the first ethylene-based polymer, the second ethylene-based polymer, and the third ethylene-based polymer forming the multilayer film 22. For example, the first layer 24 of the multilayer film 22 and the monolayer film 21 may each comprise one or more of the same polymers.

Referring again to FIG. 1B, in multilayer embodiments where the first layer 24 comprises less than 100 wt. % of the first ethylene-based polymer, the first layer 24 of the multilayer film 22 may further comprise one or more additional ethylene-based polymers such as, one or more low density polyethylenes (LDPE) having a melt index from 0.1 to 5 g/10 min, one or more additional linear low density polyethylenes (LLDPE) having a density of 0.930 g/cm$^3$ or less and a melt index from 0.1 to 5 g/10 min. or one or more high density polyethylenes (HDPE) having a density of 0.940 g/cm³ or greater and a melt index from 0.1 to 5 g/10 min. LDPE may be added to increase melt strength, which is beneficial for the extrusion process. LLDPE may be added to increase flexibility of the resulting film. HDPE may be added for increased strength of the resulting film and for its barrier properties. In one or more embodiments, the first layer 24 may include up to 40 wt. % of a HDPE to increase the strength properties of the multilayer film 22. Additional ethylene-based polymers, which may comprise the remainder of the first layer 24 of the multilayer film 22, include those commercially available from the Dow Chemical Company under the names AFFINITY™, DOWLEX™, UNIVAL™, AGILITY™, TUFLIN™, ATTANE™, INNATE™ and ELITE™ including, for example, UNIVAL™ DMDA 6200 NT7.

Moreover, in multilayer embodiments where the second layer 26 of the multilayer film 22 comprises less than 100 wt. % of the second ethylene-based polymer, the second layer 26 further comprises one or more additional ethylene-based polymers such as, one or more low density polyethylenes (LDPE) having a melt index from 0.1 to 5 g/10 min, one or more additional linear low density polyethylenes (LLDPE) having a density of 0.930 g/cm³ or less and a melt index from 0.1 to 5 g/10 min, or one or more high density polyethylenes (HDPE) having a density of 0.940 g/cm³ or greater and a melt index from 0.1 to 5 g/10 min. Additional ethylene-based polymers which may comprise the remainder of the second layer 26 of the multilayer film 22 include those commercially available from the Dow Chemical Company, Midland, Mich. under the names AFFINITY™, DOWLEX™, UNIVAL™ AGILITY™, TUFLIN™, ATTANE™, INNATE™, and ELITE™.

Furthermore, in multilayer embodiments where the inner layer 28 comprises less than 100 wt. % of the third ethylene-based polymer, the inner layer 28 of the multilayer film 22 may further comprise one or more additional ethylene-based polymers such as, one or more low density polyethylenes (LDPE) having a melt index from 0.1 to 5 g/10 min, one or more additional linear low density polyethylenes (LLDPE) having a density of 0.930 g/cm³ or less and a melt index from 0.1 to 5 g/10 min, or one or more high density polyethylenes (HDPE) having a density of 0.940 g/cm³ or greater and a melt index from 0.1 to 5 g/10 min. In one or more embodiments, the inner layer 28 may include up to 70 wt. % of a LDPE to increase the melt strength properties of the multilayer film 22 during extrusion. In one or more embodiments, the inner layer 28 may include up to 300 wt. % of a LLDPE to increase flexibility the multilayer film 22. Additional ethylene-based polymers which may comprise the remainder of the inner layer 28 of the multilayer film 22 include those commercially available from the Dow Chemical Company under the names AFFINITY™, DOWLEX™, UNIVAL™, AGILITY™, TUFLIN™, ATTANE™, INNATE™, and ELITE™ including, for example, DOW™ LDPE 1321 and DOWLEX™ NG 2045B.

Examples of the fourth ethylene-based polymer having a density from 0.905 to 0.930 g/cm³, a melt index ($I_2$) of 0.1 to 0.9 g/10 min, and a peak melting point of less than 126° C. and forming 30 to 60 wt. % of the monolayer film 21 include those commercially available from the Dow Chemical Company, Midland, Mich. including, for example, DOW™ LDPE 1321.

For embodiments where the monolayer film 21 comprise less than 100 wt. % of the fourth ethylene-based polymer, the monolayer film 21 may further comprise one or more additional ethylene-based polymers such as, one or more low density polyethylenes (LDPE) having a melt index from 0.1 to 5 g/10 min, one or more additional linear low density polyethylenes (LLDPE) having a density of 0.930 g/cm³ or less and a melt index from 0.1 to 5 g/10 min, or one or more high density polyethylenes (HDPE) having a density of 0.940 g/cm³ or greater and a melt index from 0.1 to 5 g/10 min. Additional ethylene-based polymers which may comprise the remainder of the monolayer film 21 include those commercially available from the Dow Chemical Company under the names AFFINITY™, DOWLEX™, AGILITY™, TUFLIN™, ATTANE™, INNATE™, and ELITE™ including, for example, DOWLEX™ 2045B and DOWLEX™ 2050B.

In some embodiments, one or more layers in the multilayer film 22 or the monolayer film 21 can comprise one or more additives. Additives can include, but are not limited to, antistatic agents, color enhancers, dyes, lubricants, fillers (for example, $TiO_2$ or $CaCO_3$), opacifiers, nucleators, processing aids, pigments, primary anti-oxidants, secondary anti-oxidants, UV stabilizers, anti-blocks, slip agents, tackifiers, fire retardants, anti-microbial agents, odor reducer agents, anti-fungal agents, oxygen scavengers, moisture scavengers, and combinations thereof, depending on the requirements of a particular application.

Traditional shrink films are formulated such that they stick to themselves or other polymeric films upon exposure to heat. This phenomena is desirable when sealing a package. However, as previously discussed, shrink films may also be utilized to wrap multiple previously shrink wrapped saleable items into a single unit for each of transport and storage in the process of unitization. Sticking or adhesion between the films would be problematic as the saleable items would potentially be damaged resulting in loss or scrapping of product. To avoid this detrimental effect, the shrink films used for unitization may be formulated and manufactured to avoid sticking or adhesion.

The present invention provides a polyurethane-based coating 30 on an outer surface of the heat-shrinkable film 10. In the case of a multilayer film 22 forming the ethylene-based polymer layer 20, the outer surface is the outer surface of the first layer 24. The term "polyurethane-based coating" is used to indicate that upon curing, the coating 30 comprises primarily polyurethane but that the coating 30 may also include, in some embodiments, unreacted reactants (e.g., polyols, isocyanates, etc.) as well as other additives.

In some embodiments, the polyurethane of the coating 30 is a polymerized reaction product of a hydroxyl terminated polyol and an isocyanate functional prepolymer. The isocyanate-functional prepolymer, in some embodiments, comprises an aromatic isocyanate. Without wishing to be bound by theory, the aromatic isocyanates are believed to provide desirable anti-adhesion properties to the resulting polyurethane. Examples of aromatic isocyanates that can be used in some embodiments of the present disclosure include any or all isomers of toluene diisocyanate (TDI) and/or any or all isomers of methylene diphenyl diisocyanate (MDI). The hydroxyl terminated polyol may comprise at least one of a hydroxyl terminated polyether, a hydroxyl terminated polyester or combinations thereof. In one or more embodiments the hydroxyl terminated polyol comprises one or more of VORANOL™ 220-110N polyether polyol (a propylene glycol initiated, 1000 molecular weight homopolymer diol) from the Dow Chemical Company, Midland, Mich., VORANOL™ 220-260 polyether polyol (a nominal 425 molecular weight homopolymer diol) from the Dow Chemical Company, Midland, Mich., and trimethylolpropane.

Further, the polyurethane of the coating 30 is solvent based. In one or more embodiments, the polyurethane may be dissolved in ethyl acetate and hexane for application to the ethylene-based polymer layer 20.

The polyurethane of the coating 30 may be formed by mixing together two separate components at a prescribed mixing ratio and then curing upon reaction between the two components. In some embodiments, the two reactant components can be prepared so as to provide a mixing ratio of 1:1 (ratio of hydroxyl terminated polyol to isocyanate-functional prepolymer) to facilitate measuring and mixing. In some embodiments, such mixing ratio can be in the range from 1:0.2 to 1:2. At such mixing ratios, in some embodiments, the isocyanate index is in the range from approximately 1:3 to approximately 3:1. The isocyanate index is defined as the ratio of the equivalent amount of isocyanate used relative to the theoretical equivalent amount times 100. Theoretical equivalent amount is equal to one equivalent isocyanate (A-side) per one equivalent B-side compounds. The amount of isocyanate free may be 1% to 15% in the component A. In some embodiments, the polyurethane may be a one-component isocyanate terminated prepolymer that reacts with ambient moisture or humidity to complete its cure.

In some embodiments, the coating 30 is formed from polyols having molecular weights between 100 and 4700 Daltons and using multifunctional reagents that impart branching such as triisopropanolamine and trimethylolpropane. Such selected materials, when reacted together and combined with certain non-reactive additives, can advantageously provide desirable heat resistance, anti-blocking character, or other properties to coated films.

In one or more embodiments, the non-reactive additives in the coating 30 include an anti-adhesion package. The anti-adhesion package may include one or more oils, one or more waxes, or both. In various embodiments, the one or more oils include refined corn oil. Further, in various embodiments, the one or more waxes include Synaceti 125 commercially available from Werner G. Smith, Inc. Cleveland, Ohio.

The coating 30 can be applied to the outer surface of the polymer film 20 using a variety of techniques by which coatings are typically applied to films including, but not limited to, for example, gravure coating and flexographic coating. Other thin coating techniques may also be used. Persons of skill in the art with equipment to apply solvent-based coatings and adhesives can readily adapt their process to apply a polyurethane coating to the polymer film 20 to obtain the coated heat-shrinkable films 10 of the present disclosure. To achieve adequate dynamic viscosity, the target solids at application will depend on the particular coating, but in some embodiments, can be in range of 15% to 80%.

The amount of coating 30 applied to the polymer film 20, in some embodiments, can be at least 0.1 gram per square meter. As used herein, the amount of coating is determined by measuring the difference of the weight of the ethylene-based polymer layer 20 before coating and after the coating 30 is applied and dried. In some embodiments, the amount of coating 30 applied to the ethylene-based polymer layer 20 is up to 5 grams per square meter. It will be appreciated that the coating 30 has no maximum coating thickness and is simply limited by the economics of avoiding an unnecessarily thick and costly coating beyond that required to provide the desired coating properties and performance. The amount of coating 30 applied to the film, in some embodiments, is 0.1 to 0.8 grams per square meter ($g/m^2$). All individual values and subranges from 0.1 to 5 $g/m^2$ are included herein and disclosed herein; for example, the amount of coating may be from a lower limit of 0.1, 0.2, 0.3, 0.4, 0.5, or 0.6 $g/m^2$ to an upper limit of 0.7, 0.8, 0.9, 1, 3, or 5 $g/m^2$. For example, the amount of coating 30 can be from 0.3 to 0.8 $g/m^2$ in some embodiments.

In one or more embodiments, the coating 30 is applied in accordance with a defined pattern of coated and uncoated regions on the outer surface of the polymer film 20. As the coated heat-shrinkable films 10 is generally provided as a rolled film, the uncoated regions are positioned in alignment with a seal area when the coated heat-shrinkable films 10 is utilized as a wrap around an object. The absence of coating 30 in the uncoated regions allows the coated heat-shrinkable films 10 to seal or adhere to itself when wrapping an object with the coating 30 retaining the benefit of eliminating adhesion in alignment with the coated regions. With a multilayer film 22 as shown in FIG. 1B, the coating 30 is applied in accordance with a defined pattern of coated and uncoated regions on the outer surface of the first layer 24 or second layer 26 of the multilayer film 22 as shown in FIG. 1B. Similarly, with a monolayer film 21 as depicted in FIG. 1A, the coating 30 is applied in accordance with a defined pattern of coated and uncoated regions on the outer surface of the monolayer film 21.

Embodiments of the present disclosure also provide articles formed from any of the heat-shrinkable films 10 described herein. Examples of such articles can include secondary packaging for grouping several products together in order to ease handling, transport, and storage of the unitized grouping of products.

With reference to FIGS. 1A and 1B, application of the heat-shrinkable films 10 as an over shrink film to unitize multiple primary packages 60 is shown. Each primary package 60 is shown as comprising multiple individual items 62 with a primary packaging film 64 bundling the individual items 62 into the saleable primary packages 60. The primary packaging film 64 may be a polymeric film. The heat-shrinkable films 10 are then utilized as a secondary packaging film to bundle multiple primary packages 60 into a larger parcel for ease of handling, transport, and storage as well as providing protection to the primary packages 60 throughout the logistics chain. The polyurethane coating 30 acts as an intermediate functional layer between the primary packaging film 64 of the primary package 60 and the ethylene-based polymer layer(s) 20 of the heat-shrinkable film 10 to substantially reduce or fully prevent adhesion between them. The adhesion prevention helps to maintain the integrity of the primary packaging film 64.

Methods of unitizing the polymer wrapped primary packages 60 include wrapping one or more of the primary packages 60 with the heat-shrinkable films 10 of this disclosure and applying thermal energy to reduce the dimensions of the heat-shrinkable film 10 to constrain the primary packages 60 within the heat-shrinkable film 10. The coating 30 comprising polyurethane is disposed proximal the one or more primary packages 60 during wrapping such that the polymeric film 64 bundling the individual products 62 of the primary packages is exposed to the coating 30 and is sequestered from the underlying ethylene-based polymer layer(s) 20.

It will be appreciated that the primary packages 60 may comprise various types of individual products 62 therein. While FIGS. 1A and 1B illustrate plastic bottles as the individual products 62, further non-limiting examples include food such as pet food or rice, glass bottles, home goods, or other products which are unitized into consolidated bundles during supply chain operations.

In various embodiments, the heat-shrinkable film 10 may be heated to at least about 120° C., at least about 140° C., at least about 150° C., at least about 180° C., or even greater than 250° C. to initiate contraction of the heat-shrinkable film 10 around one or more of the primary packages 60. In embodiments, the heat-shrinkable film 10 may be heated to a temperature in the range of from about 140° C. to about 190° C. or from about 150° C. to about 180° C. to initiate contraction of the heat-shrinkable film 10 around one or more of the primary packages 60. The heating hold time may be from about 1 seconds to about 1 minute, from about 2 seconds to about 30 seconds, or from about 3 seconds to about 20 seconds.

The thickness of the heat-shrinkable film 10 utilized for unitization of multiple primary packages 60 of wrapped individual products 62 into a single grouping as a secondary packaging can be selected depending on a number of factors including, for example, the size of the primary packages 60, the volume of the primary packages 60, the weight of the primary packages 60 and individual products 62, the contents of the primary packages 60, the desired properties of the secondary packaging, and other factors. In some such embodiments, the heat-shrinkable film 10 has a thickness of 20 to 500 microns. An individual values and subranges from 20 to 500 microns are included herein and disclosed herein; for example, the thickness of the heat-shrinkable film 10 may be from a lower limit of 20, 30, 40, 50, 60, 70, 80, 90, 100, 110, 120, 130, 140, 150, 160, 170, 180, or 190 microns to an upper limit of 30, 40, 50, 60, 70, 80, 90, 100, 110, 120, 130, 140, 150, 160, 170, 180, 190, 200, 220, 250, 280, 300, 330, 350, 370, 400, 430, 450, 470, or 500 microns. It is noted that 25.4 microns is the equivalent of 1 mil of thickness providing a disclosed range of approximately 1 to 20 mils for the thickness of the heat-shrinkable film.

Test Methods

Unless otherwise indicated herein, the following analytical methods are used in the describing aspects of the present invention:

Melt Index

Melt indices $I_2$ and $I_{10}$ are measured in accordance to ASTM D-1238 at 190° C. and at 2.16 kg and 10 kg load, respectively. Their values are reported in g/10 min. "Melt flow rate" is used for polypropylene based resins and determined according to ASTM D1238 (230° C. at 2.16 kg).

Density

Samples for density measurement are prepared according to ASTM D4703. Measurements are made, according to ASTM D792, Method B, within one hour of sample pressing.

Peak Melting Point

Peak melting point is determined by Differential Scanning calorimetry (DSC) where the film is conditioned at 230° C. for 3 minutes prior to cooling at a rate of 10° C. per minute to a temperature of −40° C. After the film is kept at −40° C. for 3 minutes, the film is heated to 200° C. at a rate of 10° C. per minute.

Dart

The film Dart Drop test determines the energy that causes a plastic film to fail, under specified conditions of impact by a free falling dart. The test result is the energy, expressed in terms of the weight of the missile falling from a specified height, which would result in the failure of 50% of the specimens tested.

Dart Impact Strength (dart) is measured according to ASTM D1709, Method A, using a 26 inch±0.4 inches (66 cm±1 cm) drop height and a polished aluminum hemispherical head of 38.10±0.13 mm in diameter.

Secant Modulus

The MD (Machine Direction) and CD (Cross Direction) 2% Secant Modulus was determined per ASTM D882 at a crosshead speed of 20 inch/minute. The width of the specimen is 1 inch and initial grip separation is 4 inches. The reported 2% Secant Modulus value was the average of five measurements.

Tear Test

Elmendorf tear testing in both the machine direction (MD) and cross direction (CD) was done in accordance with ASTM D1922, type B—constant radius.

Puncture Resistance

Puncture resistance is measured on a ZWICK model Z010 with TestXpertII software. The specimen size is 6"×6" and at least 5 measurements are made to determine an average puncture value. A 1000 Newton load cell is used with a round specimen holder. The specimen is a 4 inch diameter circular specimen. The Puncture resistance procedures follow ASTM D5748-95 standard, with modification to the probe described here. The puncture probe is a ½ inch diameter ball shaped polished stainless steel probe. There is no gauge length; the probe is as close as possible to, but not touching, the specimen. The probe is set by raising the probe until it touched the specimen. Then the probe is gradually lowered, until it is not touching the specimen. Then the crosshead is set at zero. Considering the maximum travel distance, the distance would be approximately 0.10 inch. The crosshead speed used is 250 mm/minute. The thickness is measured in the middle of the specimen. The thickness of the film, the distance the crosshead traveled, and the peak load are used to determine the puncture by the software. The puncture probe is cleaned after each specimen. The puncture energy is the area under the curve of the load/elongation curve (in Joules).

Young's Modulus

The MD (Machine Direction) and CD (Cross Direction) Young's Modulus, or Modulus of Elasticity, is obtained in the same apparatus as Secant Modulus, which is determined per ASTM D882. The width of the specimen is 1 inch and initial grip separation is 4 inches at a crosshead speed of 20 inch/minute. The reported Young's Modulus value was the average of five measurements. Young Modulus is the slope of the straight line portion of a stress-strain diagram.

Free Shrinkage

Unrestrained linear thermal shrinkage of plastic film and sheeting is measured in accordance with a Dow Internal Method based on ASTM D 2732-70. 5 specimens of 50 mm of diameter are prepared and conditioned at 23±2° C. and 50±5% relative humidity for 40 h prior to test. The test is held in a HANATEK Mod 2010. When test temperature of 150° C. is reached and stabilized, a few drops of silicon oil are added to the copper disc. As the oil spreads and stabilizes at the given temperature, samples are carefully placed as flat as possible in the hot-plate for 20 s. Then, samples are removed from the carrier disc and placed the cooling area, centralized so that shrinkage percentage can be read off.

The percentage of free shrinkage is given by: %=[($L_0$−$L_f$)/$L_0$]×100, where $L_0$=initial length of side and $L_f$=length after shrinking. The free shrinkage value is calculated in the MD (Machine Direction) and the CD (Cross Direction) and is the average of five respective measurements.

Heat Seal Test

Heat seal measurements on the film are performed on a commercial tensile testing machine according to ASTM F-88 (Technique A). The heat seal test is a gauge of the strength of seals (seal strength) in flexible barrier materials. It does this by measuring the force required to separate a test strip of material containing the seal and identifies the mode of specimen failure. Seal strength is relevant to the opening force and package integrity. Prior to cutting, the films are conditioned for a minimum of 40 hours at 23° C. (+2° C.) and 50% (+5%) R.H. (relative humidity) per ASTM D-618 (procedure A). Sheets are then cut from the three-layer coextruded laminated film in the machine direction to a length of approximately 11 inches and a width of approximately 8.5 inches. The sheets are heat sealed across the machine direction on a Brugger HSG-C sealer over a range of temperatures under the following conditions: Sealing Pressure, or dwell force: 0.138 N/mm$^2$ (20 psi) and dwell times of 0.3 s and 0.5 s.

Some embodiments of the invention will now be described in detail in the following Examples.

EXAMPLES

Preparation of Monolayer Film for Polyurethane Coating

An ethylene-based polymer heat-shrinkable monolayer film was produced via blown film extrusion as Comparative Film 1. The Comparative Film 1 was prepared in accordance with a standard formulation presently utilized for marketable ethylene-based polymer heat-shrinkable films. The formulation is provided below as Table 1 with the properties of the individual resins provided as Table 2. The Comparative Film 1 was produced on a Collin Blown Film line with a blow up ratio (B.U.R.) of 3.0, a die diameter of 80 mm, a die gap of 1.8 mm, and treated with 40 dynes of corona. Further, the Comparative Film 1 was prepared with the following processing conditions: a melt temperature of 219° C., a die temperature of 235° C., a RPM of 59 rpm, an output of 22.43 kg/hr, a pressure of 258 bar, and a layflat of 377 mm.

TABLE 1

Comparative Film 1 Formulation

| Description | Film thickness (μm) | Formulation |
| --- | --- | --- |
| Comparative Film 1 | 80 | 50% DOW ™ LDPE 132I<br>30% DOWLEX ™ 2045.11B<br>20% DOWLEX ™ 2050B |

TABLE 2

Selected Resin Properties

| Resin | Density (g/cm$^3$) | Melt Index (g/10 min) | Peak Melting Point (° C.) |
| --- | --- | --- | --- |
| DOW ™ LDPE 132I | 0.921 | 0.25 | 110 |
| DOWLEX ™ 2045.11B | 0.921 | 1.0 | 122 |
| DOWLEX ™ 2050B | 0.950 | 0.95 | 130 |

The Comparative Film 1 was coated with 0.8 g/m$^2$ of OPULUX™ HGT 2020/2021 from the Dow Chemical Company, Midland, Mich. with a Labo Combi 400 lamination machine operating at 100 ft/min. OPULUX™ HGT 202/2021 is a solvent based polyurethane in accordance with the present disclosure. The produced heat-shrinkable film coated with OPULUX™ HGT was designated as Inventive Film 2. The layer structure and formulation is provided in Table 3.

TABLE 3

Inventive Film 2 Formulation

| Description | | Formulation |
| --- | --- | --- |
| Inventive Film 2 | A | 50% DOW ™ LDPE 132I<br>30% DOWLEX ™ 2045.11B<br>20% DOWLEX ™ 2050B |
| | B | OPULUX ™ HGT 2020/2021 |

Performance Testing of Monolayer Film

Comparative testing of Comparative Film 1 and Inventive Film 2 was completed to evaluate over shrink film stickiness to primary packages. Specifically, each of Comparative Film 1 and Inventive Film 2 were used to bundle six different types of primary packages. The description of each type of primary package is provided in Table 4. The primary packages were bundled with each of Comparative Film 1 and Inventive Film 2 individually and passed through a Smipack BP shrink tunnel running at 2 m/min and 180° C. Passage at 2 m/min and 180° C. is within the typical temperature range used in shrink tunnels for packaging lines.

TABLE 4

Primary packages for Study

| Primary package Identifier | Description | Composition |
| --- | --- | --- |
| Package 1 | Transparent polyethylene (PE) shrink package | Transparent PE collation shrink film bundling water bottles |
| Package 2 | Printed polyethylene shrink package | Printed PE collation shrink film bundling beverage bottles |
| Package 3 | Polyethylene pillow pouch | Printed PE pillow pouch for rice |
| Package 4 | Pet food bags with polyethylene terephthalate (PET) at external layer | Laminated PET/PE pet food packaging |
| Package 5 | Transparent polypropylene (PP) shrink package | Transparent PP/PE/PP coextruded collation shrink film for beverage cans |
| Package 6 | Biaxially oriented polypropylene (BOPP) bags | Printed BOPP bag for pasta |

The unitized bundling of the six package types were tested for adhesion between the internal packaging and the over shrink film of Comparative Film 1 and Inventive Film 2. Testing was completed by removing the over shrink film from the bundled packages and checking for fusion or stickiness to the primary package and damage to the primary package from removal of Comparative Film 1 and Inventive Film 2. The adhesion results are provided in Table 5 and Table 6.

TABLE 5

Adhesion Results for Comparative Film 1

| Comparative Film 1 over Primary package | Stickiness Observations after Shrinkage at 180° C. |
| --- | --- |
| Package 1 | Stickiness - damaged primary package |
| Package 2 | Stickiness - damaged primary package |
| Package 3 | Stickiness - damaged primary package |

TABLE 5-continued

Adhesion Results for Comparative Film 1

| Comparative Film 1 over Primary package | Stickiness Observations after Shrinkage at 180° C. |
|---|---|
| Package 4 | Stickiness at packaging edges |
| Package 5 | No stickiness |
| Package 6 | Adhesion to BOPP surface - damaged primary package |

As indicated in Table 5, all primary packages were damaged by usage of Comparative Film 1 except for package 5. Specifically, Comparative Film 1 presented adhesion to the primary packages formulated with PE. That is packages 1, 2, and 3 were damaged from adhesion to the over shrink film of Comparative Film 1 and thus would be disabled from display on a shelf in a retail setting. With respect to package 4, the Comparative Film 1 did not specifically stick to the outer surface of the pet food bags which comprised PET, but did stick to the edges where the core layer of PE was exposed. As expected, as package 5 is composed of PP/PE/PP, Comparative Film 1 did not stick to the internal packaging. Finally, the Comparative Film 1 exhibited some adhesion to package 6 requiring force to separate and damaging the appearance of the primary packages. Evidence of the adhesion after shrinkage was left on both the removed Comparative Film 1 surface and the surface of package 6.

TABLE 6

Adhesion Results for Inventive Film 2

| Inventive Film 2 over Primary package | Stickiness Observations after Shrinkage at 180° C. |
|---|---|
| Package 1 | No stickiness |
| Package 2 | No stickiness |
| Package 3 | No stickiness |
| Package 4 | No stickiness |
| Package 5 | No stickiness |
| Package 6 | No stickiness |

Inventive Film 2 did not stick to any of the primary packages after passing through the shrink tunnel. The six primary packages were each tightly wrapped and bundled by the Inventive Film 2 and the primary packages had their integrity maintained upon removal of the Inventive Film 2 without any damage.

Retention of mechanical and shrinkage properties of Comparative Film 1 upon application of the OPULUX™ HGT polyurethane coating to generate Inventive Film 2 was measured. Retention of mechanical and shrinkage properties is desired to achieve sufficient shrinkage and packaging robustness to constrain individual packages to be unitized during the entire distribution chain. The mechanical and shrinkage properties of Comparative Film 1 and Inventive Film 2 are provided in Table 7. Multiple properties were evaluated including dart drop resistance conducted in accordance with ASTM D 1709; elmendorf tear evaluation in the cross direction (CD) and machine direction (MD) conducted in accordance with ASTM D1922; protrusion puncture resistance evaluation in accordance with ASTM D5748; secant modulus 2% in accordance with ASTM D 882; tensile properties in accordance with ASTM D 882; and shrinkage at 150° C. in cross direction (CD) and machine direction (MD) in accordance with ASTM D 2732.

TABLE 7

Mechanical and Free Shrinkage Properties of Example Films

| | Comparative Film 1 | Inventive Film 2 |
|---|---|---|
| Dart Drop (Method A) (g) | 184 ± 15 | 265 ± 15 |
| Elmendorf MD (g) | 336 ± 21 | 354 ± 27 |
| Elmendorf CD (g) | 1113 ± 29 | 807 ± 33 |
| Puncture Energy (J) | 4.60 ± 0.32 | 3.68 ± 0.095 |
| Puncture Resistance (J/cm$^3$) | 6.84 ± 0.531 | 6.16 ± 0.175 |
| Secant Modulus 2% MD (MPa) | 270 ± 5 | 257 ± 15 |
| Secant Modulus 2% CD (MPa) | 282 ± 12 | 288 ± 15 |
| Young Modulus MD (MPa) | 418 | 452 |
| Young Modulus CD (MPa) | 475 | 441 |
| Free Shrinkage at 150° C. MD (%) | 57.5 | 40 |
| Free Shrinkage at 150° C. CD (%) | 20 | 12 |

The Inventive Film 2 substantially retained the mechanical and shrinkage properties of the uncoated film of Comparative Film 1 and provides a film suitable for secondary packaging and unitization. While the shrinkage as measured in the machine direction (MD) at 150° C. demonstrates a 30% decrease, insufficient shrinkage was not observed in practice.

Preparation of Multilayer Films for Polyurethane Coating

Three ethylene-based polymer heat-shrinkable multilayer films were produced via blown film extrusion. The formulations for each prepared multilayer film are provided below as Table 8 with the properties of the individual resins provided as Table 9. A first multilayer film designated as Comparative Film 3 was prepared having the first layer and the second layer comprised of the same polymer formulation and the inner layer comprised of a second polymer formulation. A second multilayer film designated as Comparative Film 4 was also prepared having the first layer and the second layer comprised of the same polymer formulation and the inner layer comprised of a second polymer formulation. Finally, a third multilayer film designated as Comparative Film 5 was also prepared having the first layer and the second layer comprised of the same polymer formulation and the inner layer comprised of a second polymer formulation. Each of Comparative Film 3, Comparative Film 4, and Comparative Film 5 were produced on a Collin Blown Film line with a blow up ratio (B.U.R.) of 3.0, a die diameter of 80 mm, a die gap of 1.8 mm, and treated with 40 dynes of corona.

TABLE 8

Multilayer Film Formulations

| Description | | Formulation |
|---|---|---|
| Comparative Film 3 | A | 60% DOW ™ LDPE 132I |
| | | 40% ELITE ™ 5111G |
| A/B/A - 25/50/25 | B | 70% DOW ™ LDPE 132I |
| | | 30% DOWLEX ™ NG 2038B |
| Comparative Film 4 | A | 15% UNIVAL ™ DMDA 6200 NT7 |
| | | 55% DOWLEX ™ NG 2045B |
| A/B/C - 25/50/25 | | 30% DOW ™ LDPE 132I |
| | B | 25% UNIVAL ™ DMDA 6200 NT7 |
| | | 15% DOWLEX ™ NG 2045B |
| | | 60% DOW ™ LDPE 132I |
| | C | 15% UNIVAL ™ DMDA 6200 NT7 |
| | | 55% DOWLEX ™ NG 2045B |
| | | 30% DOW ™ LDPE 132I |

TABLE 8-continued

Multilayer Film Formulations

| Description | | Formulation |
|---|---|---|
| Comparative Film 5 A/B/A - 25/50/25 | A | 80% DOWLEX ™ NG 2045B 20% DOW ™ LDPE 132I |
| | B | 60% UNIVAL ™ DMDA 6200 NT7 40% DOWLEX ™ NG 2045B |

TABLE 9

Selected Resin Properties

| Resin | Density (g/cm³) | Melt Index (g/10 min) | Peak Melting Point (° C.) |
|---|---|---|---|
| DOW ™ LDPE 132I | 0.921 | 0.25 | 110 |
| DOWLEX ™ 2045B | 0.921 | 1.0 | 119 |
| DOWLEX ™ 2038B | 0.935 | 1.0 | 126 |
| ELITE ™ 5111G | 0.925 | 0.85 | 123 |
| UNIVAL ™ DMDA 6200 NT7 | 0.953 | 0.38 | 131 |

Each of Comparative Film 3, Comparative Film 4, and Comparative Film 5 were coated with 0.1 g/m², 0.3 g/m², and 0.5 g/m² of OPULUX™ HGT 2020/2021 to generate an array of Inventive Films delineated in Table 10. OPULUX™ is a two component reactive polyurethane with OPULUX™ 2020 being —OH terminated and OPULUX™ 2021 being —NCO terminated. OPULUX™ is formed using Poliol 1000 and 2000, both bi-functional, and is reacted with Toluene Di isocyanate (TDI) or Methyl diphenyl di isocyanate (MDI). Further, the OPULUX™ is solvent based and is dissolved in ethyl acetate and hexane for application.

TABLE 10

OPULUX ™ HGT 2020/2021 Coated Multilayer Films

| Polyurethane Coated Film | Base Film | Coating (OPULUX ™ HGT 2020/2021) |
|---|---|---|
| Inventive Film 6 | Comparative Film 3 | 0.1 g/m² |
| Inventive Film 7 | | 0.3 g/m² |
| Inventive Film 8 | | 0.5 g/m² |
| Inventive Film 9 | Comparative Film 4 | 0.1 g/m² |
| Inventive Film 10 | | 0.3 g/m² |
| Inventive Film 11 | | 0.5 g/m² |
| Inventive Film 12 | Comparative Film 5 | 0.1 g/m² |
| Inventive Film 13 | | 0.3 g/m² |
| Inventive Film 14 | | 0.5 g/m² |

Each of Comparative Film 3, Comparative Film 4, and Comparative Film 5 were also coated with 0.1 g/m², 0.3 g/m², and 0.5 g/m² of Bayderm® Bottom 51 UD, available from Lanxess Chemical Company, Cologne, Germany, to generate an array of comparative polyurethane coated Example Films delineated in Table 11. Bayderm® Bottom 51 UD is a polyurethane dispersion in water which contains long chain poliol PM 2000, bi-functional reacted with isophorone Diisocyanate (IPDI) and dimethyl propanoic acid (RMPA). The reaction is terminated using trimethylamine (TEA) and propylene diamine (PDA) is added to consume any isocyanate (NCO) residual. As such, Bayderm® Bottom 51 UD comprises aliphatic isocyanate in contravention to the aromatic isocyanate of the OPULUXTF HGT 2020/2021.

TABLE 11

Bayderm ® Bottom 51 UD Coated Multilayer Films

| Polyurethane Coated Film | Base Film | Coating (Bayderm ® Bottom 51 UD) |
|---|---|---|
| Comparative Film 15 | Comparative Film 3 | 0.1 g/m² |
| Comparative Film 16 | | 0.3 g/m² |
| Comparative Film 17 | | 0.5 g/m² |
| Comparative Film 18 | Comparative Film 4 | 0.1 g/m² |
| Comparative Film 19 | | 0.3 g/m² |
| Comparative Film 20 | | 0.5 g/m² |
| Comparative Film 21 | Comparative Film 5 | 0.1 g/m² |
| Comparative Film 22 | | 0.3 g/m² |
| Comparative Film 23 | | 0.5 g/m² |

Performance Testing of Multilayer Films

To establish a comparison of the adhesion properties to an underlying package of the inventive multilayer films with the OPULUX™ HGT 2020/2021 coating (Inventive Films 6-14) to an uncoated multilayer film (Comparative Film 4) to the adhesion properties to an underlying package of the comparative multilayer films with the Bayderm® Bottom 51 UD coating (Inventive Films 15-23) to an uncoated multilayer film (Comparative Film 4) a heat seal study was completed. Specifically, each multilayer Example Film in the study (Example Films 3-23) was submitted to heat seal testing with an uncoated standard polyethylene collation shrink film (Comparative Film 4) to simulate the contact of such external films wrapping around internal unitized packs and passage through a shrink tunnel. Heat seal testing was completed in accordance with ASTM F88 with a dwell force of 20 pounds per square inch (psi) and a dwell time of 0.3 seconds (s) in a first test and 0.5 s in a second test. Testing was also completed at a sealing temperature of 150° C. and a sealing temperature of 180° C. for each film combination and dwell time. The resulting heat seal force (gram force per square inch—grf/in²) required to separate the tested Example Film from the generic uncoated polyethylene shrink film of Comparative Film 4 is provided in Table 12 through Table 17. Specifically, Table 12, Table 13, and Table 14 provides the heat seal force required to separate the fused films with a dwell time of 0.3 s and Table 15, Table 16, and Table 17 provides the heat seal force required to separate the fused films with a dwell time of 0.5 s.

TABLE 12

Heat Seal Force - Uncoated Multilayer Film - Dwell Time: 0.3 s

| Representative Secondary Packaging | Representative Primary Package | | Sealing Temperature: 150° C. | 180° C. |
|---|---|---|---|---|
| | | Coating weight: No Coating | | |
| Comparative Film 3 | Comparative Film 4 | Heat seal force (grf/in²): | 2626 ± 75.3 | 2831 ± 78.9 |
| Comparative Film 4 | Comparative Film 4 | | 2570 ± 71.8 | 3346 ± 69.1 |
| Comparative Film 5 | Comparative Film 4 | | 2804 ± 88.1 | 2911 ± 77.4 |

TABLE 13

Heat Seal Force - OPULUX ™ Coated Multilayer Film Dwell Time: 0.3 s

| OPULUX ™ HGT 2020/2021 Coated Film (Representative Secondary Packaging) | Uncoated Film (Representative Primary Package) | | Sealing Temperature: 150° C. | 180° C. |
|---|---|---|---|---|
| | | Coating weight: 0.1 g/m² | | |
| Inventive Film 6 | Comparative Film 4 | Heat seal force (grf/in²): | 832 ± 19.1 | 905 ± 23.3 |
| Inventive Film 9 | Comparative Film 4 | | 889 ± 19.9 | 910 ± 25.9 |
| Inventive Film 12 | Comparative Film 4 | | 750 ± 17.8 | 890.23.1 |
| | | Coating weight: 0.3 g/m² | | |
| Inventive Film 7 | Comparative Film 4 | Heat seal force (grf/in²): | 270 ± 17.7 | 350 ± 12.9 |
| Inventive Film 10 | Comparative Film 4 | | 317 ± 20.1 | 456 ± 14.4 |
| Inventive Film 13 | Comparative Film 4 | | 272 ± 15.3 | 440 ± 13.8 |
| | | Coating weight: 0.5 g/m² | | |
| Inventive Film 8 | Comparative Film 4 | Heat seal force (grf/in²): | 135 ± 9.9 | 217 ± 12.8 |
| Inventive Film 11 | Comparative Film 4 | | 100 ± 5.3 | 207 ± 8.8 |
| Inventive Film 14 | Comparative Film 4 | | 50 ± 2.9 | 350 ± 15.3 |

TABLE 14

Heat Seal Force - Bayderm ® Coated Multilayer Film - Dwell Time: 0.3 s

| Bayderm ® Bottom 51 UD Coated Film (Representative Secondary Packaging) | Uncoated Film (Representative Primary Package) | | Sealing Temperature: 150° C. | 180° C. |
|---|---|---|---|---|
| | | Coating weight: 0.1 g/m² | | |
| Comparative Film 15 | Comparative Film 4 | Heat seal force (grf/in²): | 1502 ± 41.6 | 1758 ± 50.5 |
| Comparative Film 18 | Comparative Film 4 | | 1468 ± 39.8 | 1855 ± 48.6 |
| Comparative Film 21 | Comparative Film 4 | | 1407 ± 41.7 | 1799 ± 53.2 |
| | | Coating weight: 0.3 g/m² | | |
| Comparative Film 16 | Comparative Film 4 | Heat seal force (grf/in²): | 1019 ± 45.8 | 1132 ± 53.5 |
| Comparative Film 19 | Comparative Film 4 | | 924 ± 42.9 | 1216 ± 52.9 |
| Comparative Film 22 | Comparative Film 4 | | 672 ± 48.9 | 691 ± 37.7 |
| | | Coating weight: 0.5 g/m² | | |
| Comparative Film 17 | Comparative Film 4 | Heat seal force (grf/in²): | 1245 ± 43.6 | 1359 ± 48.9 |
| Comparative Film 20 | Comparative Film 4 | | 680 ± 38.9 | 1056 ± 41.7 |
| Comparative Film 23 | Comparative Film 4 | | 884 ± 33.2 | 1372 ± 43.7 |

TABLE 15

Heat Seal Force - Uncoated Multilayer Film - Dwell Time: 0.5 s

| Uncoated Film 1 | Uncoated Film 2 | | Sealing Temperature: 150° C. | 180° C. |
|---|---|---|---|---|
| | | Coating weight: No Coating | | |
| Comparative Film 3 | Comparative Film 4 | Heat seal force (grf/in²): | 2756 ± 91.9 | 2825 ± 98.5 |
| Comparative Film 4 | Comparative Film 4 | | 2901 ± 95.7 | 3014 ± 109.9 |
| Comparative Film 5 | Comparative Film 4 | | 2857 ± 88.9 | 2945 ± 87.8 |

TABLE 16

Heat Seal Force - OPULUX ™ Coated Multilayer Film - Dwell Time: 0.5 s

| OPULUX ™ HGT 2020/2021 Coated Film (Representative Secondary Packaging) | Uncoated Film (Representative Primary Package) | | Sealing Temperature: 150° C. | 180° C. |
|---|---|---|---|---|
| Coating weight: 0.1 g/m² | | | | |
| Inventive Film 6 | Comparative Film 4 | Heat seal | 1325 ± 76.8 | 1603 ± 81.8 |
| Inventive Film 9 | Comparative Film 4 | force | 1387 ± 65.9 | 1678 ± 79.9 |
| Inventive Film 12 | Comparative Film 4 | (grf/in²): | 1276 ± 49.9 | 1635 ± 66.6 |
| Coating weight: 0.3 g/m² | | | | |
| Inventive Film 7 | Comparative Film 4 | Heat seal | 226 ± 20.8 | 566 ± 33.3 |
| Inventive Film 10 | Comparative Film 4 | force | 337 ± 10.9 | 558 ± 45.9 |
| Inventive Film 13 | Comparative Film 4 | (grf/in²): | 320 ± 23.6 | 580 ± 23.3 |
| Coating weight: 0.5 g/m² | | | | |
| Inventive Film 8 | Comparative Film 4 | Heat seal | 124 ± 20.8 | 195 ± 18.7 |
| Inventive Film 11 | Comparative Film 4 | force | 102 ± 19.9 | 229 ± 13.6 |
| Inventive Film 14 | Comparative Film 4 | (grf/in²): | 144 ± 22.6 | 219 ± 23.1 |

TABLE 17

Heat Seal Force - Bayderm ® Coated Multilayer Film - Dwell Time: 0.5 s

| Bayderm ® Bottom 51 UD Coated Film (Representative Secondary Packaging) | Uncoated Film (Representative Primary Package) | | Sealing Temperature: 150° C. | 180° C. |
|---|---|---|---|---|
| Coating weight: 0.1 g/m² | | | | |
| Comparative Film 15 | Comparative Film 4 | Heat seal | 2368 ± 202.6 | 2698 ± 211.6 |
| Comparative Film 18 | Comparative Film 4 | force | 2496 ± 198.6 | 2510 ± 167.4 |
| Comparative Film 21 | Comparative Film 4 | (grf/in²): | 2410 ± 99.9 | 2756 ± 198.5 |
| Coating weight: 0.3 g/m² | | | | |
| Comparative Film 16 | Comparative Film 4 | Heat seal | 2250 ± 220.6 | 2480 ± 306.1 |
| Comparative Film 19 | Comparative Film 4 | force | 2098 ± 155.8 | 2349 ± 298.5 |
| Comparative Film 22 | Comparative Film 4 | (grf/in²): | 2115 ± 104.8 | 2505 ± 245.6 |
| Coating weight: 0.5 g/m² | | | | |
| Comparative Film 17 | Comparative Film 4 | Heat seal | 1420 ± 105.8 | 1760 ± 155.9 |
| Comparative Film 20 | Comparative Film 4 | force | 1180 ± 102.5 | 1410 ± 168.4 |
| Comparative Film 23 | Comparative Film 4 | (grf/in²): | 1210 ± 86.6 | 1730 ± 112.6 |

Figure 2:
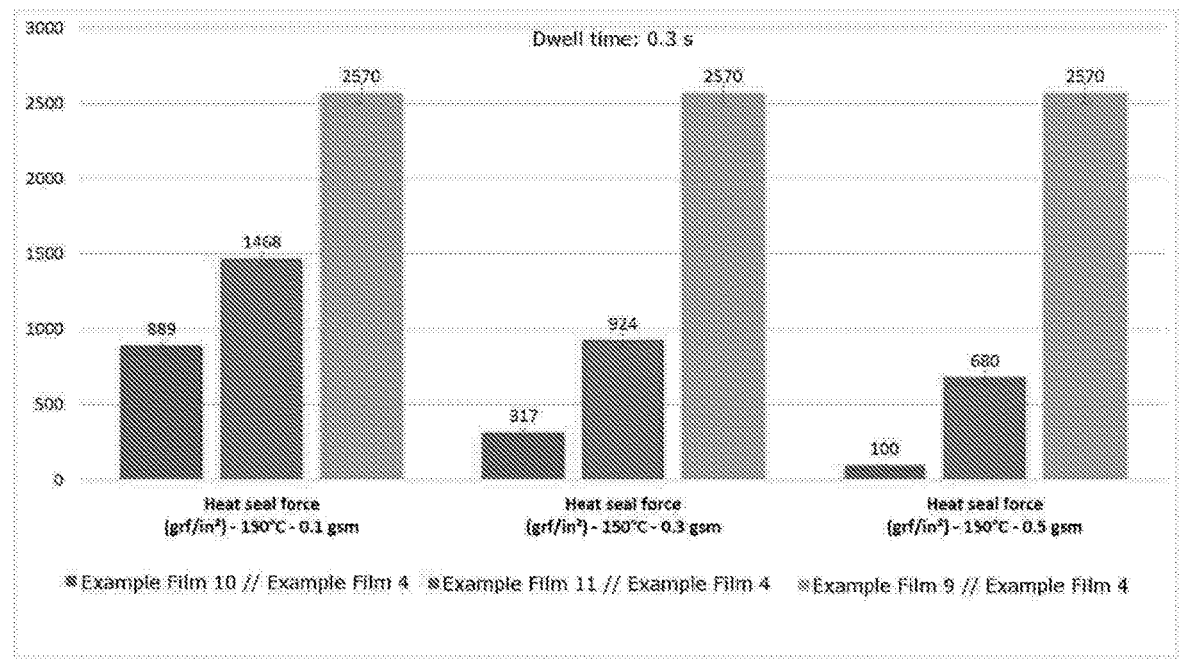
FIG. 2 is a graph depicting comparative heat seal force between multilayer films with a sealing dwell time of 0.3 seconds.
Figure 3:
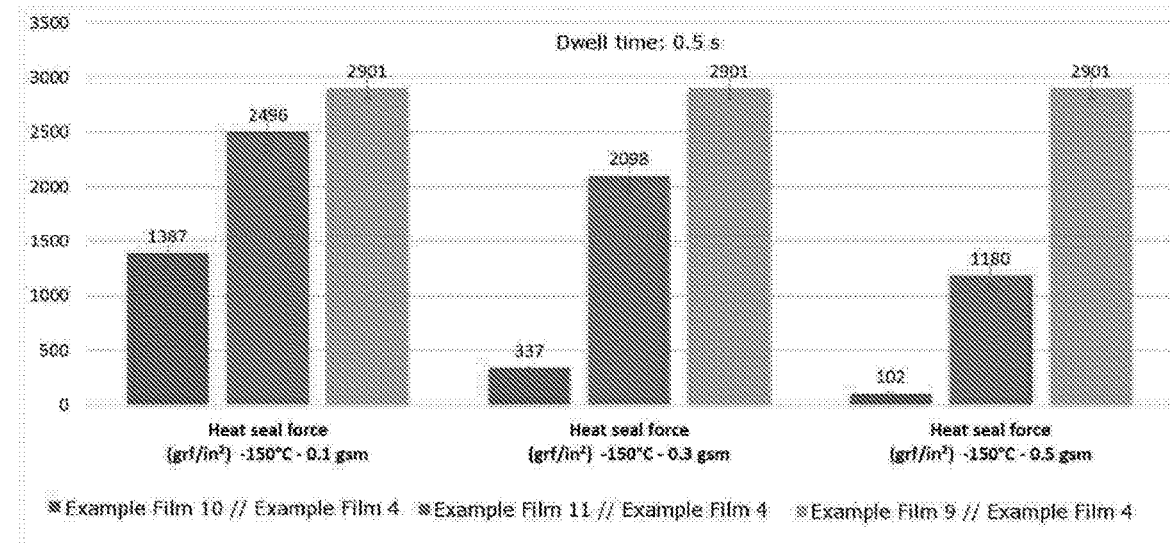
FIG. 3 is a graph depicting comparative heat seal force between multilayer films with a sealing dwell time of 0.5 seconds.

Application of the OPULUX™ 2020/2021 coating to a multilayer film in accordance with embodiments of the present disclosure provides a significant decrease in heat seal force compared to both (a) adhesion between two uncoated multilayer films and (b) adhesion between an uncoated multilayer film and a multilayer film coated with Bayderm® Bottom 51 UD. With reference to FIG. 2, the reduction in seal force with application of OPULUX™ 2020/2021 may be visually discerned for sealing with a dwell time of 0.3 s. Similarly, with reference to FIG. 3, the reduction in seal force with application of OPULUX™ 2020/2021 may be visually discerned for sealing with a dwell time of 0.3 s. Additionally, the increased reduction in seal force as the coating density is increased from 0.1 g/m² to 0.5 g/m² is acutely visualized in both FIG. 2 and FIG. 3. While Bayderm® Bottom 51 UD, which includes an aliphatic isocyanate, demonstrates a decrease in heat seal force, the superior performance of OPULUX™ 2020/2021, which includes aromatic isocyanate functional prepolymer, is evident.

It will be apparent that modifications and variations are possible without departing from the scope of the disclosure defined in the appended claims. More specifically, although some aspects of the present disclosure are identified herein as preferred or particularly advantageous, it is contemplated that the present disclosure is not necessarily limited to these aspects.

It will be apparent in combination with the claims and drawings that use of the singular also includes the possibility of the plural. For example, reference to a coating layer also implicitly includes reference to at least one coating layer.

The invention claimed is:

1. A heat-shrinkable film having a monolayer structure comprising:
    (a) a monolayer film comprising from 30 to 60 percent by weight of an ethylene-based polymer, where the ethylene-based polymer has a density of 0.905 to 0.930 g/cm³, a melt index ($I_2$) of 0.1 to 0.9 g/10 min when measured according to ASTM D 1238 at 190° C. and 2.16 kg load; and a peak melting point of less than 126° C. as measured using Differential Scanning Calorimetry (DSC);
(b) a coating on an outer surface of the monolayer film comprising:
polyurethane which is the polymerized reaction product of: (a) a hydroxyl terminated polyol; and (b) an aromatic isocyanate functional prepolymer; and
an anti-adhesion package comprising one or more oils, one or more waxes, or both.

2. The heat-shrinkable film of claim 1, wherein the monolayer film comprises:
from 40 to 60 percent by weight ethylene-based polymer having a density of 0.910 to 0.930 g/cm$^3$ and a melt index ($I_2$) measured according to ASTM D 1238 of 0.2 to 0.3 g/10 min;
from 20 to 40 percent by weight ethylene-based polymer having a density of 0.910 to 0.930 g/cm$^3$ and a melt index ($I_2$) of 0.9 to 1.1 g/10 min; and
from 10 to 30 percent by weight ethylene-based polymer having a density of 0.940 to 0.960 g/cm$^3$ and a melt index ($I_2$) of 0.85 to 1.05 g/10 min.

3. The heat-shrinkable film of claim 1, wherein the hydroxyl terminated polyol comprises a hydroxyl terminated polyether polyol, a hydroxyl terminated polyester polyol, or combinations thereof.

4. The heat-shrinkable film of claim 1, wherein the aromatic isocyanate functional prepolymer comprises toluene diisocyanate, methyldiphenyl diisocyanate, or combinations thereof.

5. The heat-shrinkable film of claim 1, wherein the heat-shrinkable film is a blown film.

6. The heat-shrinkable film of claim 1, wherein the coating is applied in accordance with a defined pattern of coated and uncoated regions on the outer surface.

7. A packaging assembly comprising:
a plurality of packages, wherein each package comprises a plurality of items bundled together by a primary packaging film comprised of polymeric material, where the primary packaging film is wrapped around the plurality of items to form a primary package; and
a secondary packaging film used to bundle the plurality of packages, wherein the secondary packaging film comprises a heat-shrinkable film comprising
(a) a monolayer film comprising from 30 to 60 percent by weight of an ethylene-based polymer, where the ethylene-based polymer has a density of 0.905 to 0.930 g/cm$^3$, a melt index ($I_2$) of 0.1 to 0.9 g/10 min when measured according to ASTM D 1238 at 190° C. and 2.16 kg load; and a peak melting point of less than 126° C. as measured using Differential Scanning Calorimetry (DSC); and
(b) a coating on an outer surface of the monolayer film comprising:
polyurethane which is the polymerized reaction product of:
(a) a hydroxyl terminated polyol; and (b) an aromatic isocyanate functional prepolymer; and
an anti-adhesion package comprising one or more oils, one or more waxes, or both.

8. d) A method of unitizing polymer wrapped primary packages, the method comprising:
wrapping one or more of the primary packages with a heat-shrinkable film; and
applying thermal energy to reduce the dimensions of the heat-shrinkable film to constrain the primary package within the heat-shrinkable film;
wherein the heat-shrinkable film comprises
(a) a monolayer film comprising from 30 to 60 percent by weight of an ethylene-based polymer, where the ethylene-based polymer has a density of 0.905 to 0.930 g/cm$^3$, a melt index ($I_2$) of 0.1 to 0.9 g/10 min when measured according to ASTM D 1238 at 190° C. and 2.16 kg load; and a peak melting point of less than 126° C. as measured using Differential Scanning Calorimetry (DSC); and
(b) a coating on an outer surface of the monolayer film comprising:
polyurethane which is the polymerized reaction product of:
(a) a hydroxyl terminated polyol; and (b) an aromatic isocyanate functional prepolymer; and
an anti-adhesion package comprising one or more oils, one or more waxes, or both.

* * * * *